US011990327B2

(12) United States Patent
Okubo et al.

(10) Patent No.: US 11,990,327 B2
(45) Date of Patent: May 21, 2024

(54) METHOD, SYSTEM AND PROGRAM FOR PROCESSING MASS SPECTROMETRY DATA

(71) Applicant: SHIMADZU CORPORATION, Kyoto (JP)

(72) Inventors: Tatsuki Okubo, Kyoto (JP); Yoshihiro Yamada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/675,059

(22) Filed: Feb. 18, 2022

(65) Prior Publication Data

US 2023/0268171 A1 Aug. 24, 2023

(51) Int. Cl.
*H01J 49/16* (2006.01)
*H01J 49/00* (2006.01)

(52) U.S. Cl.
CPC ........ *H01J 49/164* (2013.01); *H01J 49/0036* (2013.01)

(58) Field of Classification Search
CPC .... H01J 49/0036; H01J 49/164; G16B 40/20; G16B 40/10; G06N 3/08
See application file for complete search history.

(56) References Cited

U.S. PATENT DOCUMENTS 11,562,165 B2* 1/2023 Arsac .................... G16B 40/00
2004/0083063 A1* 4/2004 McClure ............ G01N 30/8624 702/22
2008/0290271 A1 11/2008 Togashi
2018/0268293 A1 9/2018 Noda
2021/0389325 A1* 12/2021 Norris ..................... G01N 1/30
2022/0004913 A1 1/2022 Nakae

FOREIGN PATENT DOCUMENTS

JP 2008-298770 A 12/2008
JP 2010-205460 A 9/2010
JP 2018-152000 A 9/2018
JP 2018-155522 A 10/2018
(Continued)

OTHER PUBLICATIONS

JP-2021025953-A, machine translation, 2023 (Year: 2023).*
(Continued)

*Primary Examiner* — Michael J Logie
(74) *Attorney, Agent, or Firm* — Sughrue Mion, PLLC

(57) ABSTRACT

In a mass spectrometer employing laser ionization to ionize a sample, a known sample is irradiated with laser light multiple times, and multiple sets of profile data are acquired each of which is a spectrum showing the relationship between the m/z values and intensities of ions generated from the known sample by one laser irradiation (Step S11). Those sets of profile data are sorted into groups so that one or more sets of profile data are included in each group (Step S12). For each group, a peak list is created which describes the m/z value and intensity of each peak originating from the known sample based on the one or more sets of profile data included in the group (Step S13). A discriminant model for discriminating an unknown sample is created using the peak lists of the plurality of groups and information concerning the kind of the known sample as training data.

9 Claims, 1 Drawing Sheet

(56) References Cited

FOREIGN PATENT DOCUMENTS

| | | | | |
|---|---|---|---|---|
| JP | 2021025953 | A | * | 2/2021 |
| WO | 2013/080169 | A1 | | 6/2013 |
| WO | 2013/149998 | A1 | | 10/2013 |
| WO | 2016/185108 | A1 | | 11/2016 |
| WO | 2019/009420 | A1 | | 1/2019 |

OTHER PUBLICATIONS

Office Action dated Sep. 13, 2022 from the Japanese Patent Office in JP Application No. 2019-145984.

Japanese Office Action dated Mar. 22, 2023 in Japanese Application No. 2019-145984.

Thomas Villmann et al., "Classification of mass-spectrometric data in clinical proteomics using learning vector quantization methods", Briefings in Bioinformatics., vol. 9., No. 2., pp. 129-143, 2008.

Tatsuki Okubo et al., Poster Presentation 3P-41, the 67th Annual Conference on Mass Spectrometry (2019).

* cited by examiner

METHOD, SYSTEM AND PROGRAM FOR PROCESSING MASS SPECTROMETRY DATA

TECHNICAL FIELD

The present invention relates to a method, system and program for processing mass spectrometry data.

BACKGROUND ART

As one type of ionization method for mass spectrometers, a matrix assisted laser desorption/ionization (MALDI) method has been commonly known. The MALDI method is a technique for enabling an analysis of a sample that barely absorbs laser light or a sample that is likely to be damaged by laser light, as with proteins. A substance which is a good absorber of laser light and is also easy to ionize is prepared as a matrix and mixed with a sample, and the mixture is irradiated with laser light to ionize the sample. In particular, a mass spectrometer employing a MALDI ion source (this type of mass spectrometer is hereinafter called the "MALDI-MS") can analyze high-molecular compounds of large molecular weights without causing significant fragmentation and is also suitable for microanalysis. Therefore, MALDI-MSs have been widely used in bioscience and other related areas.

Meanwhile, in recent years, attempts to discriminate unknown samples by applying machine learning to mass spectra acquired by MALDI-MSs have been pushed forward (for example, see Patent Literature 1). Machine learning is one of the useful techniques for finding a regularity among a huge amount and wide variety of data, and performing a prediction, discrimination or regression of data using that regularity. Machine learning can be roughly divided into supervised learning and unsupervised learning. For example, in the case where the kind (e.g., species, subspecies, strain or type) of a microorganism is to be discriminated based on the result of an analysis of the microorganism by a MALDI-MS, a large number of sets of mass spectrometry data for various kinds of microorganisms are collected beforehand, and supervised learning using those sets of data as training data is performed to build a discriminant model for discriminating the kind of unknown sample.

CITATION LIST

Patent Literature

Patent Literature 1: JP 2018-155522 A
Patent Literature 2: JP 2010-205460 A

SUMMARY OF INVENTION

Technical Problem

To build a highly accurate discriminant model, a large number of sets of training data must be collected. To this end, it is necessary to perform mass spectrometric analyses a large number of times, which requires a considerable amount of time, labor and cost.

The present invention has been developed in view of the previously described point. Its object is to provide a method, system and program for processing mass spectrometry data by which a huge amount of training data required for building a highly accurate discriminant model can be obtained with a small number of times of mass spectrometric analysis.

Solution to Problem

A method for processing mass spectrometry data according to the present invention developed for solving the previously described problem includes the steps of:

acquiring a plurality of sets of profile data by performing laser-light irradiation of a known sample a plurality of times in a mass spectrometer configured to ionize a sample by laser ionization, where each of the plurality of sets of profile data represents a spectrum showing a relationship between the m/z values and the intensities of ions generated from the known sample at one of the plurality of times of laser-light irradiation;

sorting the plurality of sets of profile data into a plurality of groups so that each of the plurality of groups includes one or more sets of profile data;

creating, for each of the plurality of groups, a peak list describing the m/z value of each peak originating from the known sample and the intensity of the same peak based on the one or more sets of profile data included in the group concerned; and creating a discriminant model for discriminating an unknown sample, using the peak lists of the plurality of groups and information concerning the kind of the known sample as training data.

A system for processing mass spectrometry data according to the present invention developed for solving the previously described problem includes:

a profile data retriever configured to retrieve a plurality of sets of profile data acquired by performing laser-light irradiation of a known sample a plurality of times in a mass spectrometer configured to ionize a sample by laser ionization, where each of the plurality of sets of profile data represents a spectrum showing a relationship between the m/z values and the intensities of ions generated from the known sample at one of the plurality of times of laser-light irradiation;

a grouping processor configured to sort the plurality of sets of profile data into a plurality of groups so that each of the plurality of groups includes one or more sets of profile data;

a peak list creator configured to create, for each of the plurality of groups, a peak list describing the m/z value of each peak originating from the known sample and the intensity of the same peak based on the one or more sets of profile data included in the group concerned; and a discriminant model creator configured to create a discriminant model for discriminating an unknown sample, using the peak lists of the plurality of groups and information concerning the kind of the known sample as training data.

A program for processing mass spectrometry data according to the present invention developed for solving the previously described problem is a program which makes a computer function as components of the previously described system for processing mass spectrometry data.

Advantageous Effects of Invention

In the method, system and program for processing mass spectrometry data according to the present invention, a plurality of sets of profile data obtained by laser irradiation performed a plurality of times for one sample are divided into a plurality of groups, and one peak list is created for each group. By this technique, the number of peak lists obtained by a mass spectrometric analysis for one sample can be increased. Consequently, a huge amount of training data required for building a highly accurate discriminant model can be obtained with a small number of times of mass spectrometric analysis.

DESCRIPTION OF EMBODIMENTS

Figure 1:
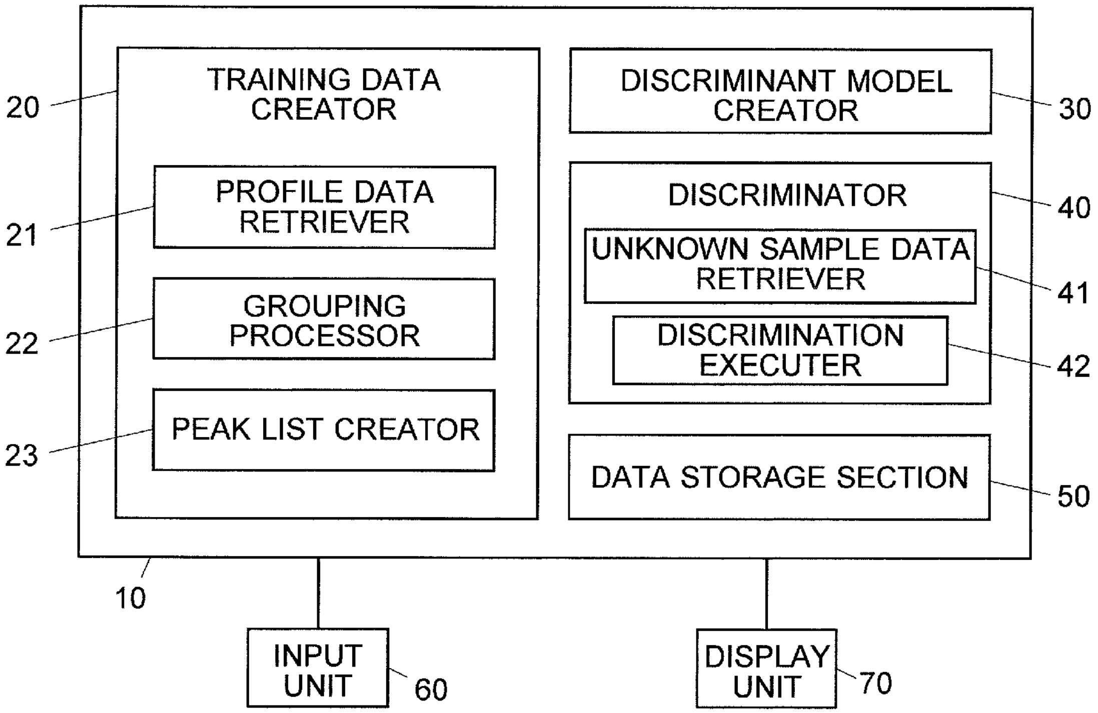
FIG. 1 is a block diagram showing the main components of a system for processing mass spectrometry data according to one embodiment of the present invention.

One mode for carrying out the present invention is hereinafter described with reference to the drawings. FIG. 1 is a block diagram showing the main components of a system 10 for processing mass spectrometry data according to one embodiment of the present invention.

The present system 10 is configured to process mass spectrometry data obtained by an analysis of a sample by a MALDI-MS (not shown). It includes a training data creator 20, discriminant model creator 30, discriminator 40, data storage section 50, input unit 60 (including a pointing device, such as a mouse, as well as a keyboard and other related devices) and display unit 70 (including a liquid crystal display or similar display device).

The training data creator 20 creates training data to be used for machine learning, by performing a predetermined processing on mass spectrometry data obtained by an analysis of a known sample (e.g., a microorganism belonging to a known strain) by a MALDI-MS. The training data creator 20 includes a profile data retriever 21, grouping processor 22 and peak list creator 23.

The discriminant model creator 30 creates a discriminant model for discriminating an unknown sample (e.g., a microorganism belonging to an unknown strain), using a plurality of sets of training data created by the training data creator 20.

The discriminator 40 determines the kind of unknown sample (e.g., the strain to which the aforementioned microorganism belongs) by applying, to the discriminant model, mass spectrometry data obtained by an analysis of the unknown sample by a MALDI-MS. The discriminator 40 includes an unknown sample data retriever 41 and discrimination executer 42.

The training data creator 20, discriminant model creator 30 and discriminator 40 are actually a computer (such as a personal computer or more sophisticated computer), on which the functions of the previously described components are realized by running, on the computer, dedicated data-processing software previously installed on the same computer. The data storage section 50 may be created on a storage device which is built in or directly connected to the computer. It is also possible to use, for example, a storage device located on a different computer system accessible from the aforementioned computer via the Internet (or the like), i.e., a storage device in a cloud computing.

The system 10 according to the present embodiment can also be configured in such a manner that the functions of the training data creator 20, discriminant model creator 30 and discriminator 40 are assigned to a plurality of computers. Specifically, for example, it is possible to assign the functions of the training data creator 20 and the discriminant model creator 30 to one computer, and the function of the discriminator 40 to another computer.

Subsequently, features of the processing in the system 10 according to the present embodiment will be described.

In general, in a MALDI-MS, a process which includes the generation of ions by laser-light irradiation, followed by the separation and detection of the resulting ions, is repeatedly performed a large number of times (e.g., 120 times) for one sample to produce a large number of sets of profile data (for example, see Patent Literature 2). Profile data is a form of data corresponding to the raw data of the mass spectrometer. It is represented by a chart showing a waveform of the detection signal continuously produced from an ion detector provided in the mass spectrometer, with the horizontal axis indicating the time (or m/z) and the vertical axis indicating the ion intensity.

In a conventional data processing method, all sets of profile data obtained with laser irradiation performed a plurality of times for one sample in the previously described manner are accumulated. Furthermore, for convenience of data processing to be performed at a later time, the peaks in the waveform of the profile data obtained through the accumulation (which is hereinafter called the "accumulated profile data") are detected (i.e., a peak detection process is performed) and converted into a list (peak list) which shows the m/z value representing the centroid position (or central position) of each detected peak and the area value of the same peak. In other words, in the conventional data processing method, one peak list is created as a result of one mass spectrometric analysis for one sample.

By comparison, in the method for processing mass spectrometry data according to the present embodiment, the sets of profile data obtained with laser irradiation performed a plurality of times for one sample in the previously described manner are divided into a plurality of groups, and one peak list is created for each group. In other words, a plurality of peak lists are created as a result of one mass spectrometric analysis for one sample. Thus, a greater number of sets of training data can be obtained without increasing the number of times of the execution of the mass spectrometric analysis.

Figure 2:
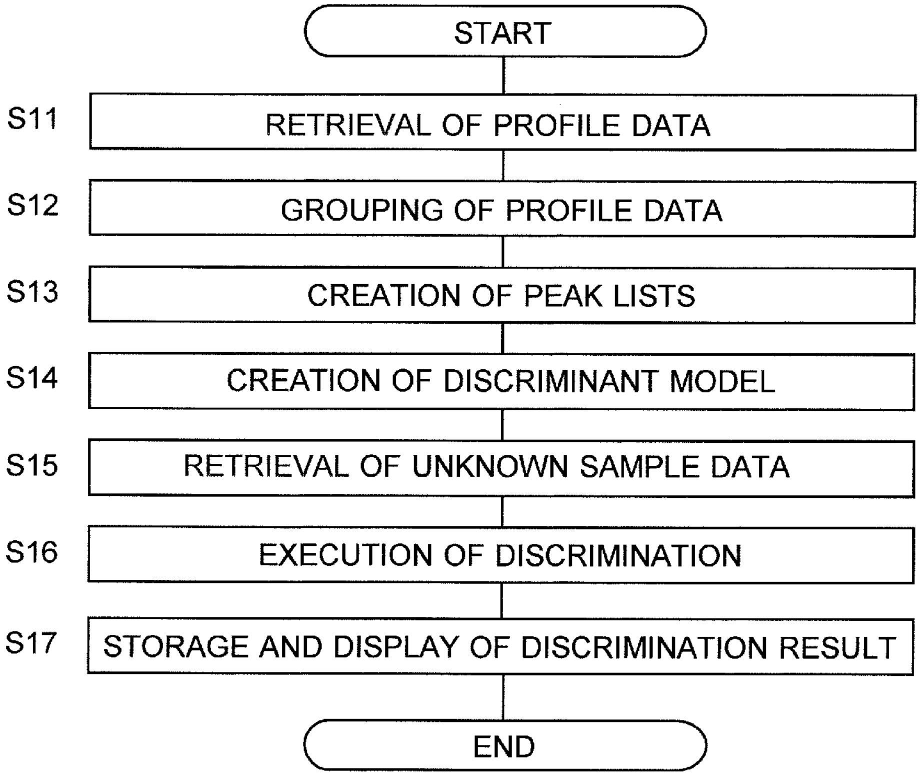
FIG. 2 is a flowchart showing the steps for processing mass spectrometry data in the same embodiment.

Details of this type of processing will be hereinafter described with reference to the flowchart in FIG. 2. It is hereinafter assumed that mass spectrometric analyses by a MALDI-MS have been performed for a plurality of known samples (e.g., microorganisms of known strains), and N sets of profile data (where N is an integer equal to or greater than two) obtained as the result of the mass spectrometric analysis for each of the known samples are associated with information of the kind of known sample concerned (e.g., information of the strain of a known microorganism) and stored in the data storage section 50. The information concerning the kind of known sample is hereinafter called the "correct-answer label".

Initially, a user performs a predetermined operation with the input unit 60 to specify the results of the mass spectrometric analyses of the plurality of known samples stored in the data storage section 50 and issues a command to create training data based on those data. Then, the creation of the training data is performed by the training data creator 20. Specifically, the profile data retriever 21 in the training data creator 20 initially retrieves, from the data storage section 50, the result of the mass spectrometric analysis for one known sample, i.e., N sets of profile data related to the sample, from among the results of the mass spectrometric analyses of the known samples specified by the user (Step S11).

Next, the grouping processor 22 sorts the N sets of profile data into M previously defined groups (where M is an integer equal to or less than N) according to a predetermined criterion, e.g., in order of creation of the profile data (Step S12). The sorting must be performed so that each of the M groups includes at least one set of profile data. Additionally, the number of sets of the profile data sorted into each group should be as equal as possible. The number M of groups may be a previously stored value in the system 10, or the system may allow the user to freely set the value. The number may also be automatically determined by the system based on specific conditions, such as the number N of sets of profile data or the required degree of discrimination accuracy.

In a sample ionization process by MALDI, the number of generated ions gradually decreases if the same site on the sample is repeatedly irradiated with laser light. Therefore, it is common to change the position of the sample or laser light so that a plurality of different positions located close to each other within the measurement area on the sample will be irradiated with the laser light. The profile data is acquired at each of those different position (measurement points). The amount of ions thereby generated from each measurement point varies depending on the variation in the density of the sample components within the measurement area. Accordingly, in Step S12 described earlier, it is preferable to randomly sort the N sets of profile data into the M groups. By this method, appropriate training data can be created without being affected by the variation in the density of the sample components within the measurement area.

In Step S12, some or all of the N sets of profile data may each be redundantly sorted into two or more groups. By this method, a substantial number of sets of profile data can be sorted into each group even when the number of sets of profile data, N, is small or that of the groups, M, is large, whereby a decrease in the signal-to-noise ratio can be avoided.

Subsequently, the peak list creator 23 creates a peak list for each of the M groups created in Step S12 (Step S13). Specific process steps performed by the peak list creator 23 are as follows: The number of sets of the profile data included in each group is checked. For a group including a plurality of sets of profile data, those sets of profile data are accumulated to create accumulated profile data. After a noise-removal process (background removal and smoothing) is performed on the accumulated profile data, peak detection is performed by a predetermined peak detection algorithm. The centroid position or central position of each detected peak as well as the area value of the same peak are determined, and a peak list describing the m/z value of the centroid position (or central position) of each peak and the area value (which corresponds to the intensity) of the same peak is created. For a group including only a single set of profile data, the accumulation process is bypassed, and a peak list is created by performing the noise-removal process (background removal and smoothing) as well as the peak detection process on that single set of profile data to create a peak list. The M peak lists thus obtained (whose number is the same as the number of groups) are associated with the correct-answer label and stored in the data storage section 50.

After that, the processing of Steps S11 through S13 is performed for all of the known samples specified by the user. Consequently, M peak lists are created for each of the known samples. It should be noted that, for simplification of the explanation, the description so far has assumed that the acquisition of N sets of profile data, the division of those sets of profile data into M groups and the creation of a peak list for each group are equally performed for all of the known samples. Actually, the number of sets of profile data, N, as well as the number of groups (and peak lists), M, may vary from one sample to another.

Subsequently, the user operates the input unit 60 to issue a command to create a discriminant model using, as training data, the peak lists respectively created for the known samples. Then, the creation of the discriminant model is performed in the discriminant model creator 30 (Step S14). Specifically, the discriminant model creator 30 reads, from the data storage section 50, the M peak lists created for each of the known samples and the correct-answer labels respectively associated with the peak lists, and creates a discriminant model by a previously specified machine-learning technique using the read data as training data. The created discriminant model is stored in the data storage section 50. The peak list in the present embodiment is multidimensional data in which the m/z value of each peak corresponds to one dimension. An example of the discriminant model is a function which expresses a relationship between a multidimensional input and an output for a discriminative analysis.

There is no specific limitation on the machine-learning technique used for creating a discriminant model in Step S14 as long as supervised learning is performed. For example, a support vector machine, random forest, neural network, linear discriminant method or non-linear discriminant method may be used. An appropriate type of technique should be selected according to the kind, nature and other aspects of the data to be analyzed.

After that, an unknown sample to be discriminated (e.g., a microorganism belonging to an unknown strain) is analyzed with a MALDI-MS. After the obtained peak list is stored in the data storage section 50, the user issues a command through the input unit 60 to perform the discrimination of the unknown sample using the discriminant model. The peak list of the unknown sample is created beforehand by accumulating all sets of profile data obtained by the analysis of the unknown sample by the MALDI-MS, and performing the background removal, smoothing and peak detection processes on the accumulated profile data. In the discriminator which has received the command from the user, the unknown sample data retriever 41 reads the peak list of the unknown sample from the data storage section 50 (Step S15), and the discrimination executer 42 discriminates the kind of the unknown sample (e.g., the strain to which the unknown microorganism belongs) from an output value obtained by inputting the peak list of the unknown sample into the discriminant model (Step S16).

The result of the discrimination by the discriminator 40 is stored in the data storage section 50. It is also displayed on the screen of the display unit 70 and presented to the user (Step S17).

It should be noted that the system and the method for processing mass spectrometry data according to the present embodiment are applicable in not only the creation of a discriminant model for the discrimination of microorganisms (e.g., for the discrimination of the species, subspecies, strain or type to which an unknown microorganism belongs) but also the creation of a discriminant model for the discrimination of various types of samples, such as the discrimination of the kind of oil, or for the discrimination of diseases (e.g., for the discrimination between biological samples originating from individuals affected with a predetermined kind of disease, such as cancer, and those originating from individuals not affected with the disease). The profile data used for creating training data as well as the peak list of an unknown sample to be discriminated in the system and the method for processing mass spectrometry data according to the present embodiment are not limited to the profile data or peak list acquired through analyses with a MALDI-MS; they may be acquired with a mass spectrometer which employs a different type of laser ionization method for sample ionization, such as a surface assisted laser desorption/ionization method.

Example

The effect of the present invention has been tested by its performance in discriminating two kinds of microorganisms (groups A and B), where group A is *Escherichia coli*, and group B is *Achromobacter* sp.

Initially, each of the samples in group A and those in group B was subjected to a measurement four times with a MALDI-MS. In each measurement, the sample was irradiated with laser light 120 times to obtain 120 sets of profile data. As a present example, those sets of profile data were processed by the method according to the present invention to create peak lists, and a discriminant model was created using those peak lists. Additionally, as a comparative example, the aforementioned sets of profile data were processed by a conventional method to create peak lists, and a discriminant model was created using those peak lists.

Specifically, in the present example, for the creation of the discriminant model, the 120 sets of profile data obtained by one measurement were randomly divided into four groups. The sets of profile data included in each group were accumulated, and the noise-removal and peak-detection processes were performed on the obtained accumulated profile data to create a single peak list. Using the 32 obtained peak lists (2 sample groups×4 measurements×4 data groups) as training data, a discriminant model for discriminating between groups A and B were created.

On the other hand, in the comparative example, for the creation of the discriminant model, all of the 120 sets of profile data obtained by one measurement were accumulated, and the noise-removal and peak-detection processes were performed on the obtained accumulated profile data to create a single peak list. Using the 8 obtained peak lists (2 sample groups×4 measurements) as training data, a discriminant model for discriminating between groups A and B were created.

In both of the present and comparative examples, a statistical analysis software product eMSTAT Solution® was used for the creation of the discriminant model, and SVM (support vector machine) was used as the machine learning algorithm (the same applies hereinafter).

A test was conducted on the performance of the discrimination by the discriminant model in the present example and that of the discrimination by the discriminant model in the comparative example. When test data were given as input, both techniques yielded a 100% correct result (as to whether a given piece of data belongs to group A or B). The error (estimated error) by cross-validation was 13% for the model in the comparative example, and 0% for the model in the present example. A leave-one-out method was used for the cross-validation (also in the second and third examples, which will be described later). That is to say, one piece of data was extracted as test data from the training data of each group, and machine learning was performed using the remaining data. This process was repeated until all pieces of data were each extracted one time as the test data. The obtained results were averaged, and the estimated error was calculated. Thus, it was confirmed that a discriminant model which is more accurate than a conventional one can be obtained according to the present invention without increasing the number of measurements.

As another (second) example, 120 sets of profile data which were the data obtained from one of the four measurements performed for each of the samples in group A and those in group B were divided into 120 groups. The noise-removal and peak-detection processes were performed on the single set of profile data included in each group to create a peak list. Using the 240 obtained peak lists (2 sample groups×1 measurement×120 data groups) as training data, a discriminant model for discriminating between groups A and B was created. The reason for the use of the profile data obtained from only one measurement for each of the groups A and B is to prevent the processing time from being too long due to an excessive number of pieces of data.

As still another (third) example, for each of the four measurements performed on the samples in group A and those in group B, the 120 sets of profile data obtained in each measurement were randomly divided into two groups. The 60 sets of profile data included in each group were accumulated, and the noise-removal and peak-detection processes were performed on the obtained accumulated profile data to create a peak list. Using the 16 obtained peak lists (2 sample groups×4 measurements×2 data groups) as training data, a discriminant model for discriminating between groups A and B was created.

A test was conducted on the performance of the discrimination by the discriminant models obtained in the second and third examples. In both cases, it was confirmed that a model with an estimated error of 0% could be created, and a 100% correct result could be obtained for test data.

[Various Modes of Invention]

A person skilled in the art can understand that the previously described illustrative embodiment is a specific example of the following modes of the present invention.

(Clause 1) A method for processing mass spectrometry data according to one mode of the present invention includes the steps of:

acquiring a plurality of sets of profile data by performing laser-light irradiation of a known sample a plurality of times in a mass spectrometer configured to ionize a sample by laser ionization, where each of the plurality of sets of profile data represents a spectrum showing a relationship between the m/z values and the intensities of ions generated from the known sample at one of the plurality of times of laser-light irradiation;

sorting the plurality of sets of profile data into a plurality of groups so that each of the plurality of groups includes one or more sets of profile data;

creating, for each of the plurality of groups, a peak list describing the m/z value of each peak originating from the known sample and the intensity of the same peak based on the one or more sets of profile data included in the group concerned; and creating a discriminant model for discriminating an unknown sample, using the peak lists of the plurality of groups and information concerning the kind of the known sample as training data.

(Clause 2) In the method for processing mass spectrometry data described in Clause 1, the plurality of sets of profile data may be randomly sorted into the plurality of groups.

(Clause 3) In the method for processing mass spectrometry data described in Clause 1 or 2, the step of sorting the plurality of sets of profile data into the plurality of groups may be performed so that at least one of the plurality of sets of profile data is redundantly sorted into two or more of the plurality of groups.

(Clause 4) The method for processing mass spectrometry data described in one of Clauses 1-3 may further include the step of performing discrimination of an unknown sample by applying, to the discriminant model, a peak list created based on profile data obtained by a mass spectrometric analysis of the unknown sample.

(Clause 5) A system for processing mass spectrometry data according to one mode of the present invention includes:

a profile data retriever configured to retrieve a plurality of sets of profile data acquired by performing laser-light irradiation of a known sample a plurality of times in a mass spectrometer configured to ionize a sample by laser ionization, where each of the plurality of sets of profile data represents a spectrum showing a relationship between the m/z values and the intensities of ions generated from the known sample at one of the plurality of times of laser-light irradiation;

a grouping processor configured to sort the plurality of sets of profile data into a plurality of groups so that each of the plurality of groups includes one or more sets of profile data;

a peak list creator configured to create, for each of the plurality of groups, a peak list describing the m/z value of each peak originating from the known sample and the intensity of the same peak based on the one or more sets of profile data included in the group concerned; and a discriminant model creator configured to create a discriminant model for discriminating an unknown sample, using the peak lists of the plurality of groups and information concerning the kind of the known sample as training data.

(Clause 6) In the system for processing mass spectrometry data described in Clause 5, the grouping processor may be configured to randomly sort the plurality of sets of profile data into the plurality of groups.

(Clause 7) In the system for processing mass spectrometry data described in Clause 5 or 6, the grouping processor may be configured to redundantly sort at least one of the plurality of sets of profile data into two or more of the plurality of groups.

(Clause 8) The system for processing mass spectrometry data described in one of Clauses 5-7 may further include a discriminator configured to perform discrimination of an unknown sample by applying, to the discriminant model, a peak list created based on profile data obtained by a mass spectrometric analysis of the unknown sample.

(Clause 9) A program for processing mass spectrometry data according to one mode of the present invention is configured to make a computer function as components of the system for processing mass spectrometry data described in one of Clauses 5-8.

By the method, system or program for processing mass spectrometry data described in Clause 1, 5 or 9, a huge amount of training data required for building a highly accurate discriminant model can be obtained with a small number of times of mass spectrometric analysis.

By the method or system for processing mass spectrometry data described in Clause 2 or 6, appropriate training data can be created without being affected by the variation in the density of the sample components within the measurement area on the sample.

By the method or system for processing mass spectrometry data described in Clause 3 or 7, a substantial number of sets of profile data can be sorted into each group even when the number of sets of profile data is small or that of the groups is large, whereby a decrease in the signal-to-noise ratio can be avoided.

REFERENCE SIGNS LIST

10 . . . System for Processing Mass Spectrometry Data
20 . . . Training Data Generator
21 . . . Profile Data Retriever
22 . . . Grouping Processor
23 . . . Peak List Creator
30 . . . Discriminant model Creator
40 . . . Discriminator
41 . . . Unknown Sample Data Retriever
42 . . . Discrimination Executer
50 . . . Data Storage Section
60 . . . Input Unit
70 . . . Display Unit

The invention claimed is:

1. A method for processing mass spectrometry data by at least one processor, comprising:

acquiring a plurality of sets of profile data for one known sample by performing laser-light irradiation of the one known sample a plurality of times in a mass spectrometer configured to ionize the one known sample by laser ionization, where each of the plurality of sets of profile data represents a spectrum showing a relationship between m/z values and intensities of ions generated from the one known sample at one of the plurality of times of laser-light irradiation;

sorting the plurality of sets of profile data into a plurality of groups so that each of the plurality of groups includes one or more sets of profile data;

creating, for each of the plurality of groups after sorting the plurality of sets of profile data to form the plurality of groups, a peak list describing an m/z value of each peak originating from the one known sample and an intensity of the same peak based on the one or more sets of profile data included in the group concerned, in which noise removal and peak detection are performed on the one or more sets of profile data when the peak lists are created after the sorting of the plurality of sets of profile data to form the plurality of groups;

creating training data by associating information of the kind of the one known sample with each of a plurality of the peak lists created for the one known sample; and creating a supervised learning discriminant model for discriminating an unknown sample, using a plurality of the training data obtained by executing the above processes for each of a plurality of known samples.

2. The method for processing mass spectrometry data according to claim 1, wherein the plurality of sets of profile data are randomly sorted into the plurality of groups.

3. The method for processing mass spectrometry data according to claim 1, wherein the step of sorting the plurality of sets of profile data into the plurality of groups is performed so that a same data of at least one of the plurality of sets of profile data is redundantly sorted into two or more of the plurality of groups.

4. The method for processing mass spectrometry data according to claim 1, further comprising a step of performing discrimination of an unknown sample by applying, to the discriminant model, a peak list created based on profile data obtained by a mass spectrometric analysis of the unknown sample.

5. A system for processing mass spectrometry data, comprising:

at least one processor configured to retrieve a plurality of sets of profile data for one known sample acquired by performing laser-light irradiation of the one known sample plurality of times in a mass spectrometer configured to ionize the one known sample by laser ionization, where each of the plurality of sets of profile data represents a spectrum showing a relationship between m/z values and intensities of ions generated from the one known sample at one of the plurality of times of laser-light irradiation;

sort the plurality of sets of profile data into a plurality of groups so that each of the plurality of groups includes one or more sets of profile data;

create, for each of the plurality of groups after the sorting of the plurality of sets, a peak list describing an m/z value of each peak originating from the one known sample and an intensity of the same peak based on the one or more sets of profile data included in the group concerned, in which noise removal and peak detection are performed on the one or more sets of profile data when the peak lists are created after the sorting of the plurality of sets of profile data to form the plurality of group;

create a training data by associating information of the kind of the one known sample with each of a plurality of the peak lists created for the one known sample; and create a supervised learning discriminant model for discriminating an unknown sample, using a plurality of the training data obtained by executing the above processes for each of a plurality of known samples.

6. The system for processing mass spectrometry data according to claim 5, wherein the at least one processor is configured to randomly sort the plurality of sets of profile data into the plurality of groups.

7. The system for processing mass spectrometry data according to claim 5, wherein the at least one processor is configured to redundantly sort at least a same data of one of the plurality of sets of profile data into two or more of the plurality of groups.

8. The system for processing mass spectrometry data according to claim 5, wherein the at least one processor is further configured to perform discrimination of an unknown sample by applying, to the discriminant model, a peak list created based on profile data obtained by a mass spectrometric analysis of the unknown sample.

9. A non-transitory computer readable medium recording a program for processing mass spectrometry data, wherein the program is configured to make a computer function as components of the system for processing mass spectrometry data according to claim 5.

* * * * *